United States Patent
Severson et al.

(10) Patent No.: US 7,031,871 B2
(45) Date of Patent: Apr. 18, 2006

(54) SENSOR ASSEMBLY FOR DETERMINING TOTAL TEMPERATURE, STATIC TEMPERATURE AND MACH NUMBER

(75) Inventors: John A. Severson, Eagan, MN (US); Kenneth J. Freeman, Eagan, MN (US); Dennis J. Cronin, Shakopee, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 35 days.

(21) Appl. No.: 10/862,068

(22) Filed: Jun. 4, 2004

(65) Prior Publication Data

US 2005/0273292 A1    Dec. 8, 2005

(51) Int. Cl.
*G01K 1/00* (2006.01)
(52) U.S. Cl. .................................... 702/130
(58) Field of Classification Search ................ 702/130
See application file for complete search history.

(56) References Cited

U.S. PATENT DOCUMENTS

| | | | |
|---|---|---|---|
| 2,755,456 A | 7/1956 | Bursack | 340/234 |
| 2,970,475 A | 2/1961 | Werner | 73/339 |
| 3,000,213 A | 9/1961 | Eves et al. | 73/349 |
| 3,057,198 A | 10/1962 | Crouchman | 73/170 |
| 3,067,577 A | 12/1962 | Dew | 60/35.6 |
| 3,162,046 A | 12/1964 | Conow et al. | 73/362 |
| 3,236,093 A | 2/1966 | Werner | 73/431 |
| 3,276,254 A | 10/1966 | Richard | 73/170 |
| 3,940,622 A | 2/1976 | Stallabrass et al. | 250/338 |
| 4,403,872 A | 9/1983 | DeLeo | 374/138 |
| 4,611,492 A | 9/1986 | Koosmann | 73/579 |
| 4,980,673 A | 12/1990 | Kleven | 340/581 |
| 5,003,295 A | 3/1991 | Kleven | 340/581 |
| 5,043,558 A | 8/1991 | Byles | 219/201 |
| 5,140,135 A | 8/1992 | Freeman | 219/497 |
| 5,299,447 A * | 4/1994 | Caron | 73/1.26 |
| 5,313,202 A | 5/1994 | Hansman, Jr. et al. | 340/962 |
| 5,397,181 A * | 3/1995 | McNulty | 374/144 |
| 5,575,440 A | 11/1996 | LeBlond et al. | 244/134 F |
| 5,628,565 A | 5/1997 | Hagen et al. | 374/143 |
| 5,653,538 A | 8/1997 | Phillips | 374/138 |
| 5,942,682 A * | 8/1999 | Ghetzler et al. | 73/147 |
| 6,070,475 A | 6/2000 | Muehlhauser et al. | 73/861.68 |
| 6,269,320 B1 | 7/2001 | Otto | 702/127 |
| 6,609,825 B1 | 8/2003 | Ice et al. | 374/138 |

(Continued)

FOREIGN PATENT DOCUMENTS

GB         674 750         7/1952

(Continued)

OTHER PUBLICATIONS

Goodrich Sensor Systems Total Temperature Sensors Technical Report 5755, 1994.

(Continued)

*Primary Examiner*—John Barlow
*Assistant Examiner*—Tung S. Lau
(74) *Attorney, Agent, or Firm*—Westman, Champlin & Kelly, P.A.

(57) ABSTRACT

A temperature sensor is provided with at least two thermometers or temperature sensing elements that have different recovery factors, and which are in the same airflow. The recovery factors for the respective thermometers are determined for the sensor and stored in a memory of a processor. The temperature measured by each of the thermometers is provided to the processor, and the processor establishes ratios using the recovery factors and measured temperatures to determine total temperature and static temperature of the airflow in which the thermometers are placed.

24 Claims, 5 Drawing Sheets

U.S. PATENT DOCUMENTS

2002/0131474 A1 9/2002 Suga .......................... 374/138
2003/0058919 A1 3/2003 Ice et al. ..................... 374/138

FOREIGN PATENT DOCUMENTS

| GB | 2 283 315 | 5/1995 |
|---|---|---|
| WO | WO 81/01331 | 5/1981 |

OTHER PUBLICATIONS

AGARD Flight Test Instrumentation Series, vol. 2 on In-Flight Temperature Measurements, (AGARD-AG-160-vol. 2, F. Trenkle & M. Reinhardt, Feb., 1973, Figure 68).
Copy of European International Search Report.

* cited by examiner

| Wind Tunnel Condiions | | | Sensor Readings (Figure 3 type) | | Calculated Tt, °C, using method of the invention | Calculated Ts, °C, using method of the invention |
|---|---|---|---|---|---|---|
| Mach No. | Tt, °C | Ts, °C | Elem "A", °C | Elem "B", °C | | |
| 0.249 | 16.24 | 12.70 | 16.21 | 16.12 | 16.24 | 12.55 |
| 0.502 | 16.23 | 2.34 | 16.10 | 15.77 | 16.22 | 2.49 |
| 0.651 | 16.12 | -6.48 | 15.96 | 15.45 | 16.13 | -4.64 |
| 0.798 | 16.00 | -16.67 | 15.71 | 14.88 | 16.01 | -18.29 |

SENSOR ASSEMBLY FOR DETERMINING TOTAL TEMPERATURE, STATIC TEMPERATURE AND MACH NUMBER

BACKGROUND OF THE INVENTION

The present invention relates to a sensor to determine total temperature, true airspeed and Mach number of an air vehicle moving through an air mass, and the static temperature of the air mass using two or more thermometers or temperature sensing elements with known, but different temperature recovery factors. One relatively unobtrusive instrument permits the determination of these parameters without large, outwardly projecting probes.

It is well known that temperature sensors or thermometers have different temperature recovery factors. The recovery factor of a thermometer is a standard measure that defines how well the thermometer "recovers" the total kinetic energy imparted to it so the thermometer will sense and indicate the true total air temperature in a moving air stream. The recovery factor is the difference ratio of the sensed temperature minus the static temperature to the total temperature minus the static temperature. If all kinetic energy could be recovered, i.e., if the air could be brought adiabatically to rest at the thermometer location, the recovery factor would be one. A high recovery factor is desired when designing total temperature sensors. It has been known that the geometry of the thermometer largely dictates its recovery factor, and the known difference in recovery factors between two or more thermometers or temperature sensing elements is utilized in the present invention for determining the desired temperature parameters, as well as true airspeed and Mach number.

SUMMARY OF THE INVENTION

The present invention relates to a temperature sensor assembly that includes two or more thermometers or temperature sensing elements with different, but known, recovery factors positioned in a moving air stream. It has been discovered that if two thermometers of different recovery factors are placed in the same air stream, the temperature sensed or measured by the respective thermometers can be used for calculating the total temperature and static temperature. It is not necessary that the recovery factor of either thermometer approach unity; in other words, it is not necessary to use a conventional total temperature sensor. Also, true airspeed and Mach number can be derived from the calculated values of total temperature and static temperature using known mathematical relationships. Pressure measurements of total pressure and static pressure would otherwise be needed to determine Mach number, which requires at least one additional pressure sensing probe. Pressure measurements alone would not allow determination of true airspeed.

An important feature is that the recovery factor (the fractional error of measured temperature relative to total temperature) is well characterized and ideally independent of Mach number. While it is known that in practice the recovery factor is at least somewhat dependent on the Mach number, selected sensor geometry can provide a reasonable independence of Mach number for sufficiently accurate Mach number derivations from the signal of two selected thermometers. If one or both recovery factors are not sufficiently independent of Mach number, a third thermometer with a different recovery factor relationship to Mach number may be introduced, and ratios can be established between the three thermometers that are unique to Mach number, and thus define the Mach number.

If the Mach number is known, the relationship of the recovery factors to Mach number for the thermometers, and the measured values of temperature can be used to calculate the static temperature and total temperature.

Providing thermometers with different recovery factors can be accomplished in many ways. Differences in the mounting geometry for the thermometers can change the recovery factor of substantially similar thermometers. For example, thermometers may be mounted in surface recesses, or near surface protrusions that affect recovery factor. Different sheathing geometries around the thermometers can result in different recovery factors.

The thermometers usually are resistance temperature sensing elements but may be of any common form, for example thermocouples.

The thermometers also can be mounted within a probe or housing such as that used for total temperature sensors as shown schematically in FIG. 3, and modified so that geometry and/or the flow rate at each of the thermometers is changed to affect the recovery factor of each. This can be achieved by selecting the proper internal duct geometry for each thermometer, or in other ways providing a different airflow over two thermometers in the same housing.

If either a total or static pressure measurement is available from another source, or if the capability to measure one of these pressures is added to the temperature based sensors previously described, it would be possible to calculate all air data parameters now achieved with present air data measurement approaches, which usually involve separate measurements of total temperature, total pressure and static pressure. Long established compressible fluid flow equations that, for example, relate total and static pressures and temperatures to Mach number, would be used to calculate other air data parameters of interest.

A sensor made according to the present invention therefore can reduce the number of external probes and the intrusiveness of probes that are required on an aircraft or other air vehicle for obtaining the necessary parameters for aircraft operation.

DETAILED DESCRIPTION OF THE PREFERRED EMBODIMENTS

Figure 1:
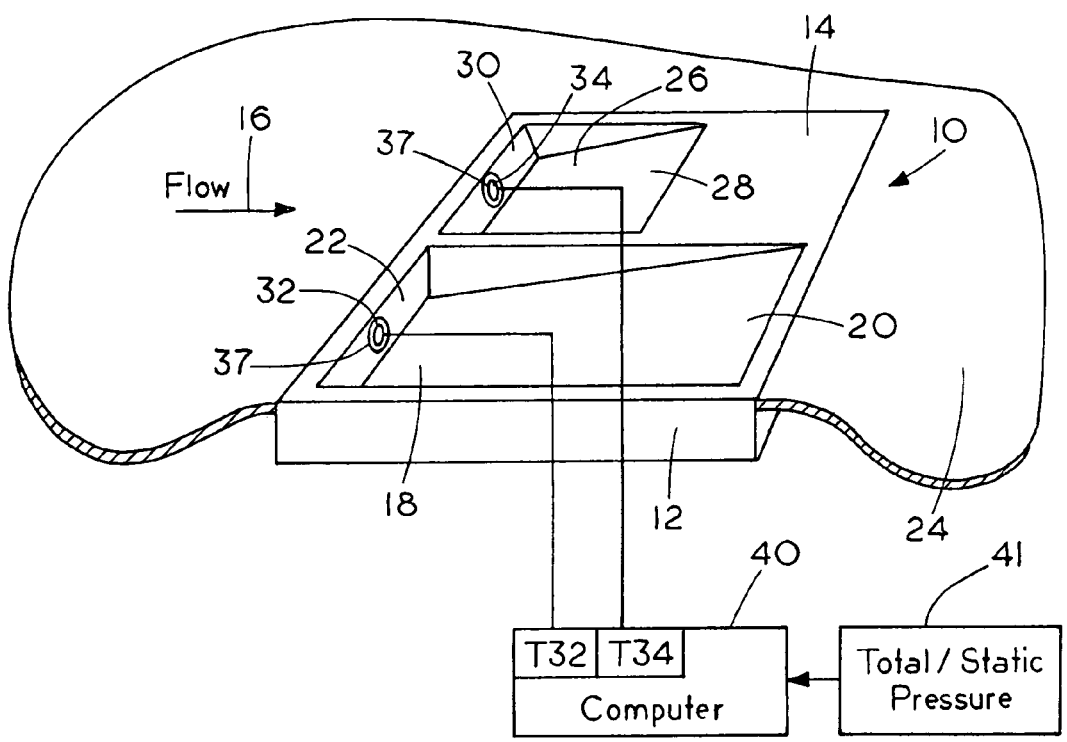
FIG. 1 is a perspective view of a typical flush mounted sensor configured to provide thermometers or temperature sensing elements mounted thereon with different recovery factors.

Referring to FIG. 1, a sensor made according to the present invention is indicated generally at 10. A sensor mounting housing 12 has an exterior surface 14 exposed to airflow that is moving in the direction as indicated by arrow 16. The sensor 10 is designed to be non-obtrusive, or in other words does not project into the air stream outwardly from a support surface a substantial amount. As shown the outer surface 14 of the housing is flush with the surface of a mounting panel 24, such as a skin of an aircraft.

The housing 12 has a first recess 18 that has a relatively long, gently tapered bottom wall 20 that extends downstream from an inner edge of an upstream wall surface 22 that is substantially normal to the surface 14 and normal to the direction of airflow. The housing 12 also has a second recess 26 in the outer surface 14, that is separate from recess 18. Second recess 26 has a shorter, more steeply inclined bottom wall 28 which extends downstream from an inner edge of an upstream wall surface 30. The wall surface 30 is at an angle less than 90° to the support panel 24 and to the direction of airflow.

A thermometer or temperature sensing element 32 is mounted on wall surface 22 at the upstream end of the first recess 18. A second thermometer or temperature sensing element 34 is mounted on the wall surface 30 at the upstream end of the recess 26. The recesses 18 and 26 are different configurations and therefore have different capabilities to capture the kinetic energy in the airstream, so that as the air flows past the sensor 10, the sensed change in total air temperature will be different on the thermometer 32 than on the thermometer 34, because the thermometers have different recovery factors.

The recovery factor is expressed as $$RF = (Tr - Ts)/(Tt - Ts).$$

In the above expression Tr is the measured or "recovered" temperature, Ts is the static temperature and Tt is the total temperature.

The geometry of the sensor, that is the geometry of configuration of housing 12 adjacent the respective thermometer, largely dictates the recovery factor. It is preferable that the housing 12 be of a thermally non-conductive nature to avoid heat transfer to or from the air as well as to or from the thermometers. Thermometers 32 and 34 may be optionally supported by a thermally insulating material 37 to mitigate heat conductive influences. The recovery factor in an accurate, generally used total temperature sensor may be around 0.97 or higher, while other thermometers, not optimized for total temperature measurement, may exhibit recovery factors as low as 0.6 or 0.7.

Placing the two different thermometers 32 and 34, as shown in FIG. 1, so as to have different recovery factors in the same air stream, or airflow, results in the recovery factor of thermometers 32 and 34 being expressed as:

$$RF_{32} = (Tr_{32} - Ts)/(Tt - Ts) \quad \text{(Equation 1)}$$

$$RF_{34} = (Tr_{34} - Ts)/(Tt - Ts) \quad \text{(Equation 2)}$$

The sensor is tested or calibrated in operating conditions in a wind tunnel so that the recovery factors of the thermometers used are known from data collected in such wind tunnel tests for example. These thermometer recovery factors $RF_{32}$ and $RF_{34}$ are established and known, and can be provided in a program in a computer 40. The temperatures are measured at each thermometers 32 and 34 ($Tr_{32}$ and $Tr_{34}$) and sensed through suitable circuitry, as shown at $T_{32}$ and $T_{34}$ in computer 40, in a known manner for resistance thermometers or temperature sensing elements.

Computer 40 is then utilized for carrying out the necessary mathematical functions for calculating the unknowns, Tt (total temperature) and Ts (static temperature), which can be determined from equations 1 and 2.

Thus, two thermometers of known, but different recovery factors, regardless of how the recovery factors are obtained, can be placed in the same air stream and used to determine total temperature and static temperature of the free stream airflow.

Mach number can be directly calculated from total temperature and static temperature using the known relationship:

$$T_{total}/T_{static} = 1 + 0.2M^2 \quad \text{(Equation 3)}$$

where temperatures are expressed as absolute temperatures. True airspeed, $V_{true}$, can be calculated with knowledge of Mach number and static temperature using the known relationship:

$$V_{true} = Mc = M(1.4RT_{static})^{0.5} \quad \text{(Equation 4)}$$

where c is the speed of sound and R is the gas constant for air. $T_{static}$ is expressed as an absolute temperature.

Thus total pressure (pitot pressure) and static pressure measurements, that would otherwise be needed to determine Mach number and true airspeed, are not needed with the present invention.

As stated, the recovery factor should be substantially independent of Mach number, which can be determined in wind tunnel tests. It is known from the AGARD Flight Test Instrumentation Series, Volume 2 on In-Flight Temperature Measurements, (AGARD-AG-160-Vol. 2, F. Trenkle & M. Reinhardt, February, 1973, FIG. 68) that commercial total temperature sensors as well as temperature sensors not designed to measure total temperature can display recovery factors substantially independent of Mach number through mid to high range subsonic flow, well within the operating parameters necessary for functioning of the present invention. Additional wind tunnel characterization or the addition of a third thermometer as previously described could further extend the operating range.

If separate inputs of one of total pressure or static pressure (or both) are available to the computer 40, as indicated by block 41 in FIG. 1, functionality can be expanded to include calculation of air data parameters in addition to total temperature, static temperature, true airspeed and Mach number by using known compressible fluid flow equations. Such equations can be used to calculate total pressure (if static pressure is a computer input), static pressure (if total pressure is a computer input), indicated airspeed, pressure altitude, air density and mass air flow.

Figure 2:
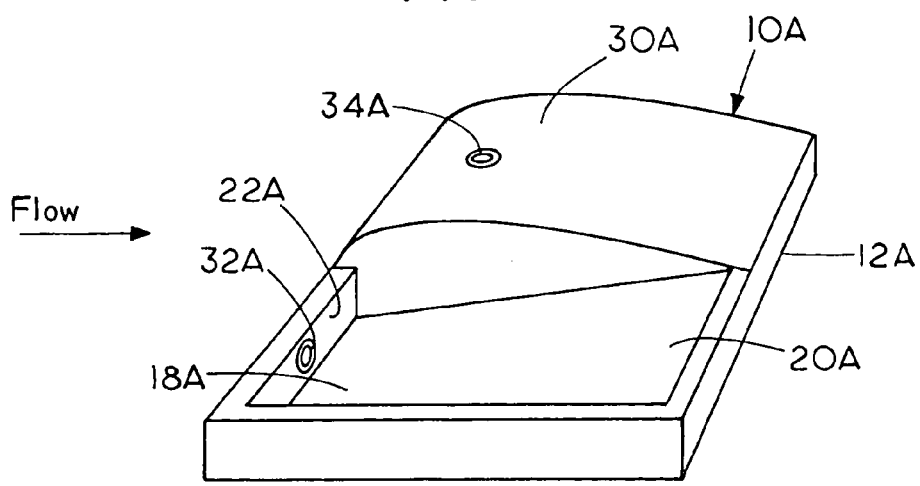
FIG. 2 is a perspective view of another substantially flush mounted sensor configured to provide thermometers mounted thereon with different recovery factors.

FIG. 2 depicts another form of the invention for achieving different recovery factors for two thermometers which are part of a sensor assembly and exposed to the same air flow. Assembly 10A is similar to that shown in FIG. 1 and includes a housing 12A that has a recess 18A that is similar to recess 18, and instead of a second recess, a portion of the housing 12A has a slightly raised (convex) aerodynamically shaped upper surface 30A.

The recess 18A has a bottom wall 20A and an upstream end wall 22A on which a thermometer 32A is mounted. A thermometer 34A is mounted on the raised, aerodynamically sloped surface 30A. The thermometers 32A and 34A have different recovery factors because of different capabilities to capture kinetic energy. Higher velocity air over the raised surface 30A results in a relative temperature depression sensed by the thermometer 34A compared to the temperature sensed by the thermometer 32A on the wall 22A in the recess 18A. Again, the thermometers may be optionally supported by a thermally insulating material 37 to mitigate effects of thermal conductivity of the housing or mountings. As shown, the thermometers 32A and 34A are coupled to computer 40. The computer is programmed to provide signals indicating the temperature at each thermometer and provide the ratios shown by equations 1 and 2.

Figure 3:
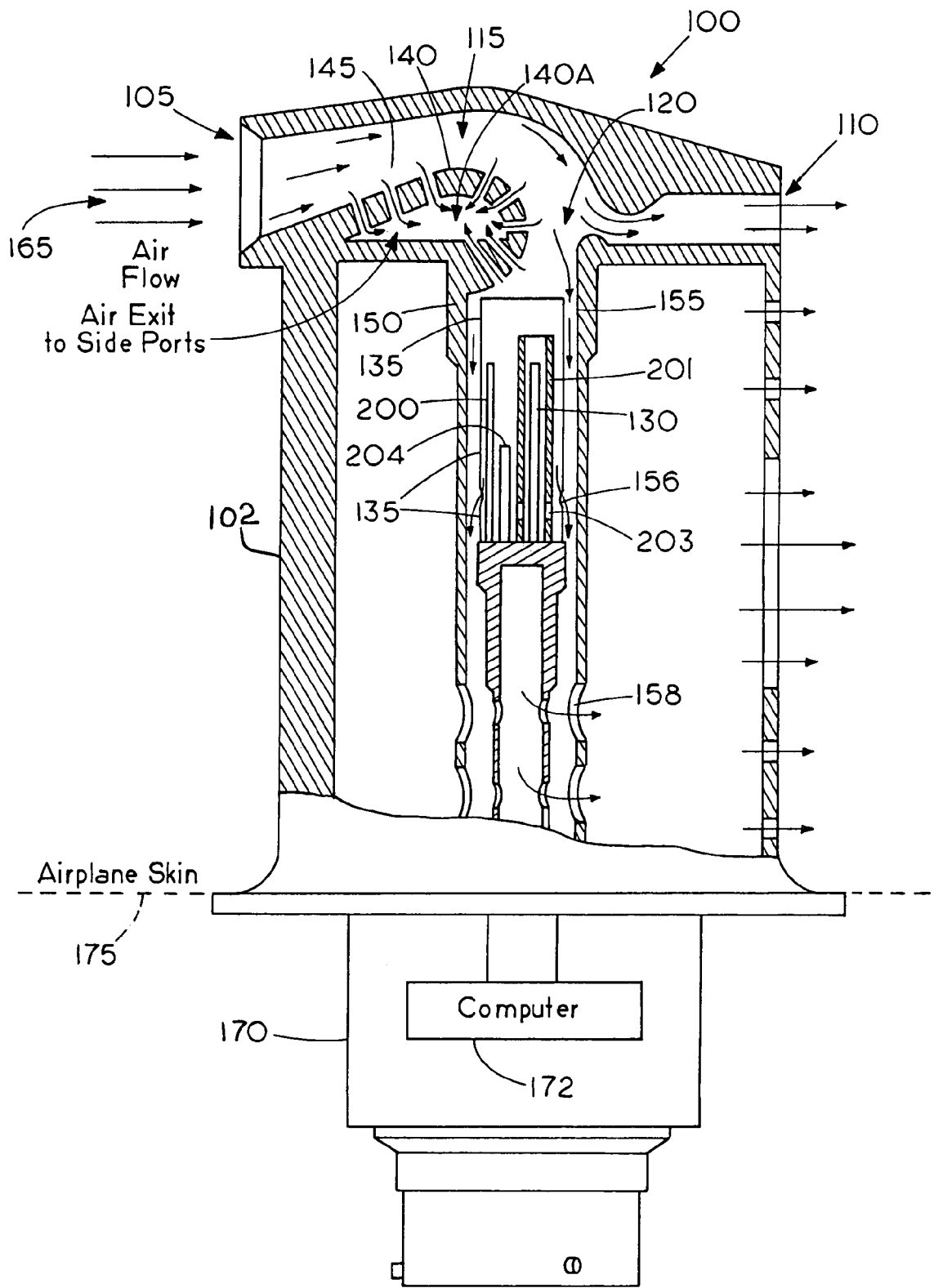
FIG. 3 is a cross section of another form of sensor housing that mounts thermometers having different recovery factors within the housing.
Figure 4:
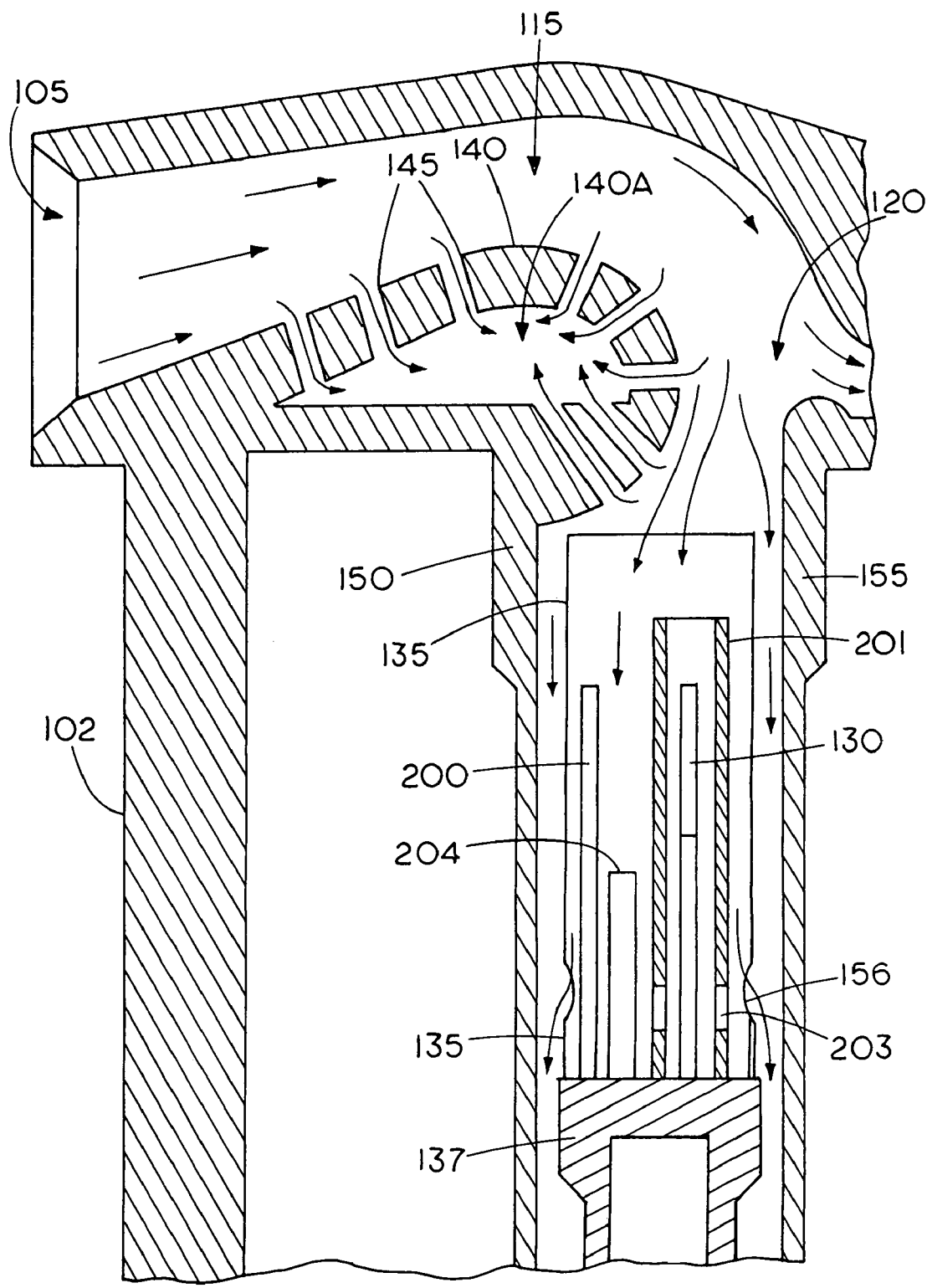
FIG. 4 is an enlarged sectional view of the mounting of the thermometers used in the housing of FIG. 3.

In FIGS. 3 and 4, a modified form of the invention is shown and comprises a probe 100, which has arrows to illustrate airflow patterns into, through and out of the probe housing 102. The housing 102 is a total temperature sensor housing modified to provide the measured temperatures needed for the present invention.

The housing 102 is shown mounted on the skin 175 of an aircraft. The housing 102 includes a section 170 on the interior of the aircraft for connectors and circuitry. The free stream airflow enters the inlet scoop 105, traveling along an axis represented by the arrows 165. Inside the inlet scoop, a flow separation bend 115 redirects the airflow such that a portion of the airflow is diverted and enters the flow passage 120.

The diverted flow through passage 120 passes along two thermometers 130 and 200 that are mounted on a pedestal 137. This air flows between a heat shield 135 and the thermometers, as well as between the heat shield 135 and the walls 150 and 155 before exiting at output ports 156, and then out through a rear opening 158.

Flow separation bend 115 not only causes parts of the airflow to be diverted, but larger particles that are carried in the airflow will not follow the diverted flow, and will exit out through the exit port 110. The flow separation is formed at an elbow wall 140 that has bleed openings or ports 145 into which air will flow. These openings are for boundary layer air control.

Thermometer 130 is locally housed within a flow tube 201, designed to limit airflow past the thermometer, which has the effect of increasing the recovery factor. The flow tube 201 has an open top end and outlet ports 203 near the bottom of the tube. Thermometer 200, however, is not surrounded by such a flow tube and will experience a lower recovery factor. The thermometers 130 and 200 can be calibrated by known wind tunnel tests at a suitable range of different air speeds.

Thus, with this arrangement, equations 1 and 2 above can be applied to the sensed temperature at each of the thermometers 130 and 200, and with the recovery factors being previously determined, calculations can be made for determining total temperature and static temperature of the air surrounding the probe 100 at a computer 172.

Figures 5A, 5B:
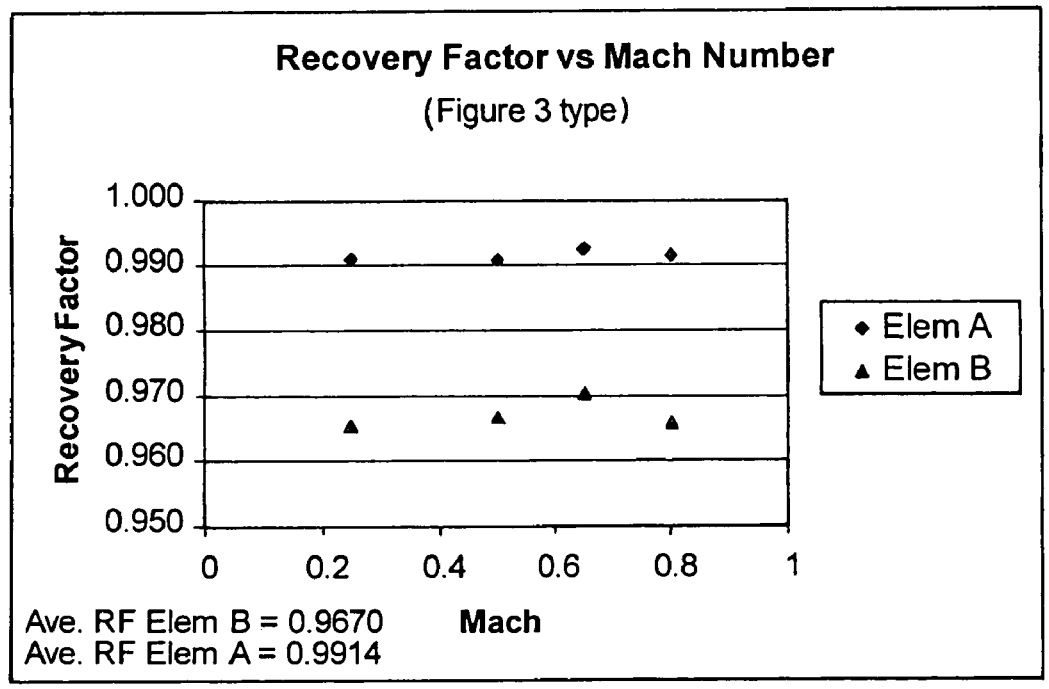
FIG. 5A is a table showing test results using concepts described herein for a proof-of-concept thermometer similar to that depicted in FIG. 3.
FIG. 5B is a graphical representation of the results tabulated in FIG. 5A.

FIG. 5A presents a table showing wind tunnel test results for a sensor similar to that depicted in FIG. 3. The table in FIG. 5A provides wind tunnel conditions from wind tunnel instrumentation, the temperatures sensed by the two temperature sensing elements, and the calculated values of total ($T_t$) and static ($T_s$) temperature using the method previously described. These calculated values compare favorably to those same temperatures obtained from the wind tunnel instrumentation in the "wind tunnel conditions" column.

The plots in FIG. 5B graphically show the results of the table of FIG. 5A and show different, and essentially Mach number independent, recovery factors for two thermometers.

It was mentioned that the recovery factor of the thermometers should ideally be independent from Mach number. By properly positioning the thermometers 130 and 200 in flow passage 120 and adjusting the thermometer position or flow passage geometry, undue dependence on Mach number can be avoided.

To provide different recovery factors, the flow rate over each of the thermometers 130 and 200 can be altered by selecting the internal duct geometry. Referring to FIGS. 3 and 4, altering the elbow surface 140 or making the outlet ports 203 in the flow tube 201 different size can change the flow rate over the respective thermometers. Air scoops could be added for altering the airflow into the respective chambers or passageways as well.

It should be noted again that if the recovery factors of the two thermometers in any form of the invention are not sufficiently independent of Mach number, a third thermometer having a third recovery factor different from the two previously mentioned thermometers can be introduced. For example, a third thermometer 204, could be supported in proximity to thermometers 130 and 200 as depicted in FIG. 3. Thermometer 204 would have a third recovery factor different from the recovery factors of thermometers 130 and 200.

Figure 6:
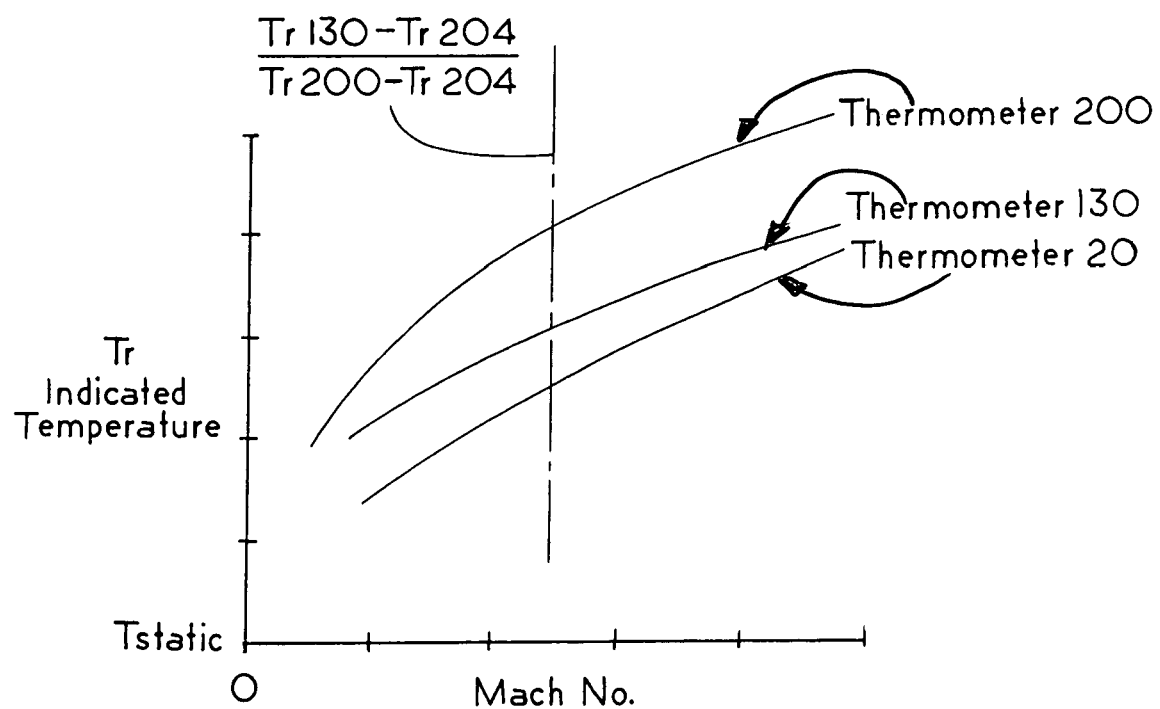
FIG. 6 is a graphical illustration of how the ratio of indicated temperature differences for three thermometers of different recovery factors is used to determine the Mach number.

The ratio of the differences of the measured temperatures at the three thermometers 130, 200 and 204, for example, would be unique to Mach number, thus defining the Mach number. This is illustrated by example in FIG. 6. It is assumed that the recovery factor of each of the three thermometers is different, which means that the indicated temperature characteristic of each thermometer as a function of Mach number is different. It can be seen through examination of FIG. 6 that the ratio of differences, for example:

$$(Tr_{130} - Tr_{204}) / (Tr_{200} - Tr_{204}) \quad \text{(Equation 5)}$$

is unique to Mach number, thus allowing determination of Mach number. Tr values on the vertical line are the indicated temperatures from the thermometers. With knowledge of Mach number and the recovery factor to Mach number relationships, static temperature and total temperature are calculated easily.

An icing conditions sensor could also be incorporated by providing a temperature sensing arrangement to detect the presence of liquid water, for example as shown in co-pending U.S. patent application Ser. No. 10/299,207, filed Nov. 19, 2002, which is incorporated by reference.

Thus, in the present invention the recovery factor of a thermometer, which can be determined by known methods, is first determined. This is done by characterizing the recovery factors of thermometers or temperature sensing elements mounted in the housing or probe to be used in aircraft service, for example, in a wind tunnel under controlled conditions of temperature and Mach number. Computational fluid dynamic analysis also can be used to predict recovery factors of the thermometers with reasonable accuracy.

Once the recovery factors for the thermometers mounted in known configurations, such as a housing or probe as shown in the drawings herein, is established, and the sensor is put into use, measurements of the temperatures sensed are utilized as explained in equations 1, 2, 3, 4 and 5 as appropriate, for determining total temperature, static temperature, true airspeed and Mach number.

Although the present invention has been described with reference to preferred embodiments, workers skilled in the art will recognize that changes may be made in form and detail without departing from the spirit and scope of the invention.

What is claimed is:

1. A temperature sensing assembly comprising a support having at least two thermometers mounted on the support, the thermometers being mounted to have different and known recovery factors when supported in common airflow, and circuitry providing signals indicating temperatures sensed at each of the thermometers, and the circuitry receiving signals representing the recovery factors of the thermometers, and being operable to calculate at least one of static temperature and total temperature of the airflow, based on the recovery factors and sensed temperatures of the two thermometers.

2. The temperature sensing assembly of claim 1 wherein the support comprises a housing having flow paths for directing airflow, said flow paths being of different configurations from each other, and a first of the thermometers mounted a first flow path, and a second of the thermometers mounted in a second flow path.

3. The temperature sensing assembly of claim 1 wherein said thermometers comprise resistance temperature sensing elements.

4. The temperature sensing assembly of claim 1, and a processor comprising the circuitry, the recovery factors of each of the thermometers being accessible to the processor, said processor receiving signals indicating measured temperature at each of the thermometers, and the processor establishing the ratios:

$$Rf_1 = (Tr_1 - Ts)/(Tt - Ts) \text{ and}$$

$$Rf_2 = (Tr_2 - Ts)/(Tt - Ts)$$

where $Rf_1$ is the recovery factor of the first thermometer, and $Rf_2$ is the recovery factor of the second thermometer, $Tr_1$ and $Tr_2$ are the measured temperatures at the first and second thermometers, respectively, Tt is total temperature, Ts is static temperature, and wherein the processor solves for the values Tt and Ts.

5. The temperature sensing assembly of claim 1 wherein said support comprises an upstream edge wall, a pair of recesses having upstream ends and downstream ends, each of the recesses having a wall surface at an upstream end extending inwardly from an outer end of the upstream edge wall, and the recesses being defined by bottom surfaces that join inner ends of the respective wall surfaces and incline outwardly in the downstream direction, the bottom surfaces having different inclinations from each other.

6. The temperature sensing assembly of claim 5, wherein said outwardly inclined bottom surfaces comprise generally planar surfaces that taper from the inner edges of the respective upstream wall surfaces to an outer surface of the support at different angles relative to the outer surface.

7. The temperature sensing assembly of claim 5, wherein the support contains both recesses, the bottom surfaces of the respective recesses being generally planar and at different angular orientations with respect to a planar bottom mounting surface of the support.

8. The temperature sensing assembly of claim 1, wherein said support has an upstream end and a downstream end, upwardly facing surfaces of the support having configurations that differ from one another in each of at least two sections, at least one of the thermometers being mounted in each of said sections, the differing configurations causing different recovery factors of the respective thermometers on the support as air flows over the upwardly facing surfaces of the support.

9. The temperature sensing assembly of claim 8, wherein the upwardly facing surface on one of the sections is concave, and the upwardly facing surface on the other section is convex.

10. The temperature sensing assembly of claim 8, wherein the upwardly facing surfaces on both sections are concave, the concavities being the deepest adjacent an upstream end of the support.

11. The temperature sensing assembly of claim 1, wherein said support comprises a housing extending outwardly from a supporting surface into a common airflow, said housing having a plurality of passageways, including a first passageway facing in a direction of airflow and providing an inlet scoop, an outlet from said first passageway, a flow separation bend in the housing at a side of the first passageway to divert a portion of the airflow from the first passageway to at least one other passageway formed in portions of the housing other than the portion having the first passageway, and an outlet opening for airflow from the at least one other passageway, the thermometers being mounted in the other portions of the housing and positioned so that each of the thermometers has a different volume of air flowing past the respective thermometer to thereby provide a recovery factor for each thermometer different from each of the other thermometers relative to free stream conditions of the airflow.

12. The temperature sensing assembly of claim 1, wherein said support comprises a housing extending outwardly from a supporting surface, said housing having a plurality of passageways therein, including a first passageway facing in a direction of airflow and providing an inlet scoop at an upstream end, an outlet from said first passageway at a downstream end thereof, a flow separation bend in the housing at a side of the first passageway, a laterally extending second passageway open to the first passageway downstream of the flow separation bend, an exit opening from said laterally extending second passageway, the at least two thermometers comprising first and second thermometers mounted in said laterally extending second passageway at positions such that the second thermometer has a different recovery factor from the first thermometer as air flows past the thermometers.

13. The temperature sensing assembly of claim 12, further characterized by a third thermometer mounted in said laterally extending second passageway.

14. The temperature sensing assembly of claim 13, wherein the thermometers provide signals $Tr_1$, $Tr_2$, and $Tr_3$ indicating temperatures measured by the respective first, second, and third thermometers as airflow velocity changes, and a circuit to receive the signals indicating $Tr_1$, $Tr_2$, $Tr_3$, and to provide a ratio $(Tr_1-Tr_2)/(Tr_1-Tr_3)$.

15. A method of determining total temperature and static temperature using sensed temperatures comprising providing two separated thermometers supported relative to a common airflow;

determining the recovery factors of each of the thermometers as supported relative to the airflow;

measuring the temperature sensed by each of the thermometers;

establishing ratios utilizing the recovery factors of the respective thermometers, and the measured temperature at each of the thermometers to solve for total temperature and static temperature of the common airflow.

16. The method of claim 15, wherein establishing ratios comprises establishing the ratios:

$Rf_1 = (Tr_1-Ts)/(Tt-Ts);$ $Rf_2 = (Tr_2-Ts)/(Tt-Ts)$ where $Rf_1$ and $Rf_2$ are the recovery factors of the respective thermometers, $Tr$ and $Tr_2$ are the measured temperatures at the respective thermometers, $Tt$ is total temperature and $Ts$ is static temperature of the airflow.

17. The method of claim 16 including providing a third thermometer having a third different recovery factor, and establishing a ratio of the differences of measured temperatures at the three thermometers comprising $(Tr_1-Tr_2)/(Tr_1-Tr_3)$, to establish a factor unique to Mach number, where $Tr_1$, $Tr_2$, and $Tr_3$ are the temperatures measured by the thermometers.

18. The method of claim 15 including further calculating at least one of Mach number and true airspeed after solving for at least one of total temperature and static temperature of the air flow.

19. The method of claim 18, wherein the further calculating of at least one of Mach number and true airspeed comprises using one of the equations:

$T_{total}/T_{static} = 1 + 0.2M^2$

Where $T_{total}$ is total temperature and $T_{static}$ is static temperature, and $V_{true} = Mc = M(1.4RT_{static})0.5$ Where $V_{true}$ is true airspeed, M is Mach number, c is the speed of sound and R is the gas constant for air. $T_{static}$ is expressed as an absolute temperature.

20. A temperature sensing assembly for determining air data parameters of air flowing past the assembly, comprising a housing having at least two thermometers mounted on the housing in positions to receive a common air flow, the thermometers having different and known recovery factors (Rf) when supported on the housing in the air flow, the thermometers each providing signals indicating temperatures sensed thereby, and a processor receiving the signals and providing ratios based on the sensed temperatures and recovery factors of the thermometers to provide outputs representing total temperature and static temperature.

21. The temperature sensing assembly of claim 20, wherein the processor establishes the ratios:

$Rf_1 = (Tr_1-Ts)/(Tt-Ts)$ and $Rf_2 = (Tr_2-Ts)/(Tt-Ts)$ where $Rf_1$ is the recovery factor of a first thermometer, and $Rf_2$ is the recovery factor of a second thermometer, $Tr_1$ and $Tr_2$ are the measured temperatures at the first and second thermometers, respectively, $Tt$ is total temperature, $Ts$ is static temperature, and wherein the processor solves for the values $Tt$ and $Ts$.

22. The temperature sensing assembly of claim 21, wherein said housing has an upstream edge wall, first and second sections formed on the housing having upstream ends and downstream ends, each of the sections having a wall surface over which air flows from the upstream end to the downstream end, the respective wall surfaces of the first and second sections being configured to have different effects on the airflow, and wherein the first and second thermometers are on different sections of the housing.

23. The temperature sensing assembly of claim 22, wherein the wall surface of the first section is recessed and concave, and the wall surface of the second section is convex.

24. The temperature sensing assembly of claim 20, and a source of a signal indicating at least one of the group consisting of measured total pressure and static pressure provided to the processor, the processor providing outputs indicating additional desired air data parameters, including at least one of Mach number, true airspeed, total pressure and static pressure.

* * * * *